United States Patent [19]

Golben

[11] Patent Number: 4,781,246

[45] Date of Patent: * Nov. 1, 1988

[54] THERMALLY REVERSIBLE HEAT EXCHANGE UNIT

[75] Inventor: Peter M. Golben, Wyckoff, N.J.

[73] Assignee: Ergenics, Inc., Wyckoff, N.J.

[*] Notice: The portion of the term of this patent subsequent to Aug. 12, 2004 has been disclaimed.

[21] Appl. No.: 377,556

[22] Filed: May 12, 1982

[51] Int. Cl.⁴ .............................................. F25B 17/08
[52] U.S. Cl. ................................ 165/104.12; 165/903; 62/48
[58] Field of Search ............... 165/104.12, 903; 62/48; 206/0.7

[56] References Cited

U.S. PATENT DOCUMENTS 4,372,376  2/1983  Nelson et al. ................... 165/104.12
4,396,114  8/1983  Golben et al. .................. 165/104.12

FOREIGN PATENT DOCUMENTS 68448  6/1978  Japan .............................. 165/104.12

*Primary Examiner*—Albert W. Davis, Jr.
*Attorney, Agent, or Firm*—Charles E. Baxley

[57] ABSTRACT

A thermally reversible heat exchange unit comprising an elongated outer jacket, at least one interior heat transfer surface and heat exchange fluid flowing therebetween in plug fashion.

4 Claims, 1 Drawing Sheet

THERMALLY REVERSIBLE HEAT EXCHANGE UNIT

The present invention is concerned with a heat exchange unit and more particularly with a thermally alternating heat exchange unit.

Thermally alternating heat exchange units are required for use in absorption-desorption systems wherein absorption from a gas phase occurs at a heat sink temperature and desorption occurs at a higher heat source temperature. For efficiency in such systems, it is necessary that good heat transfer be accompanied by rapid thermal reversal. In particular with hydride systems such as refrigerators, heat pumps, compressors and hydrogen storage devices wherein hydrogen is chemically combined with an intermetallic compound such as FeTi or an $AB_5$ compound where A is principally calcium or a rare earth metal and B is principally nickel or cobalt, there is a substantial need for rapidly reversible heat exchange units which can withdraw heat from and provide heat to hydride and hydridable alloy using heat sinks and heat sources of moderate temperature, e.g. 300° K. for heat sink and 325° K. to 380° K. for heat sources.

It is the object of the present invention to provide a novel thermally reversible heat exchange unit.

Another object of the invention is to provide a novel thermally reversible heat exchange unit incorporating a hydride container or containers of enhanced thermal conductivity and hydrogen accessibility.

Other objects and advantages will become apparent from the following description taken in conjunction with the drawing in which.

Generally speaking, the present invention contemplates a thermally alternating heat exchange unit which comprises an elongated jacket and at least one enlongated heat transfer surface inside the jacket positioned essentially parallel to the longitudinal axis of the jacket. The jacket contains a heat exchange liquid adapted to flow between the wall of the jacket and the heat transfer surface under a head adapted to provide plug flow of the liquid through the jacket.

Specifically the jacket may be a straight tube or the tube may be coiled, meandered or otherwise adapted to fit in an available volume. Plug flow of liquid means flow in such a manner that when a liquid of one temperature is flowing through the jacket and then flow is changed by external valving to provide a flow of miscible liquid of different temperature, there is little or no mixing of the liquids in the jacket and when the plug of the first liquid exits the jacket the exit port will experience a sharp temperature demarkation rather than a gradual temperature change.

Figure 1:
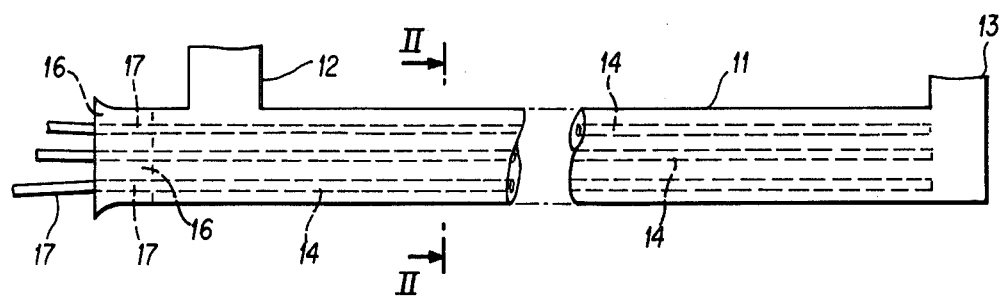
FIG. 1 is a longitudinal view in phantom of a heat exchange unit of the present invention.
Figure 2:
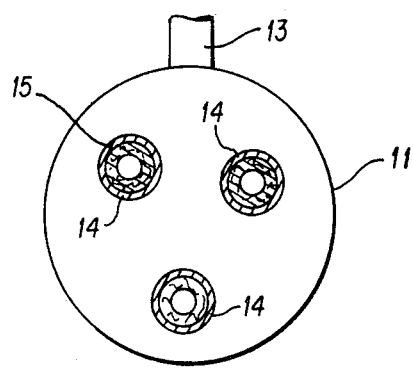
FIG. 2 is a cross-sectional view of the heat exchange unit of FIG. 1 at the section II—II and FIG. 3 is a cross-sectional view of a hydride container as shown in FIG. 2 along section III—III.
Figure 3:
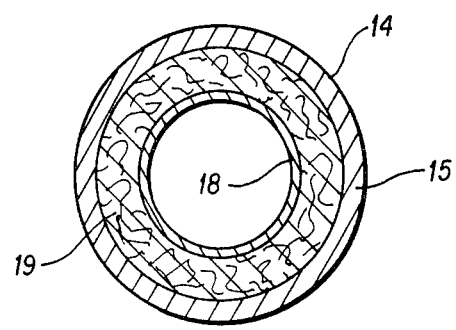

A heat exchange unit of the present invention is illustrated in the drawing. Referring now thereto and particularly to FIGS. 1 and 2, elongated jacket 11 comprising a tube of any material, e.g. metal or plastic capable of holding flowing heat transfer liquid e.g. water at moderate temperature is provided with inlet 12 and outlet 13. Within jacket 11 are three (as illustrated but may be more or less) close-ended hydride containers 14 the walls 15 of which comprise heat transfer surfaces. These walls are depicted in FIGS. 2 and 3 as being of metal i.e. a hydrogen resistant metal such as copper or stainless steel. Containers 14 are enclosed in jacekt 11 by any convenient means 16 and may as illustrated be provided with inlet tubes 17 of reduced diameter to facilitate leak-proof sealing in jacket 11. A most advantageous design of hydride containers 14 is depicted in FIG. 3 which shows metal wall 15, an essentially coaxial coiled spring means 18 defining a central hydrogen gas space and confining hydridable material 19 between spring means 18 and wall 15. This design is the subject of a prior Golben et al application filed in the United States on Sept. 21, 1981 now U.S. Pat. No. 4,396,114.

In a particular operation, the thermally reversible heat exchange unit of the present invention comprises a jacket about 300 cm long and about 2.9 cm in outside diameter. When fed with water at a rate of about 8 liters per minute, plug flow occurs and it takes about 7 to 8 seconds for water of one temperature to displace water of another temperature in jacket 11 without substantial mixing of the waters.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A thermally alternating heat exchange unit comprising an elongated tubular jacket having a width and a length much greater than the width, said jacket having an outlet at one end and an inlet at the other end, at least one elongated metal heat transfer surface therein positioned essentially parallel to the longitudinal axis of said jacket and being substantially equal in length to said jacket, there being a spacing between said transfer surface and a wall of said jacket configured to permit a heat exchange liquid to flow between the wall of said jacket and said heat transfer surface, and wherein the ratio of said jacket length to said jacket width is sufficiently large to permit a flow of successive portions of miscible heat exchange liquid of differing temperatures between said inlet and said outlet while retaining a difference in temperatures between two successive ones of said liquid portions.

2. A heat exchange unit as in claim 1 further comprising at least one metal tube, and wherein any one of said at least one elongated heat transfer surface is the exterior surface of said at least one metal tube, said tube extending through said jacket in leak proof sealing configuration.

3. A heat exchange unit as in claim 2 wherein said at least one tube is made of hydrogen resistant metal having one end within said jacket closed, having the other end exterior to said jacket open to a source of hydrogen and having a hydridable material in the interior thereof.

4. A heat exchange unit as in claim 3 wherein said closed-end hydride container contains an essentially coaxial spring defining a central hydrogen gas space and confining metallic hydride former against the tube wall.

* * * * *